US012718520B2

(12) United States Patent
Proeber et al.

(10) Patent No.: US 12,718,520 B2
(45) Date of Patent: Aug. 25, 2026

(54) PLUMBING FIXTURE PRODUCT IDENTIFICATION

(71) Applicant: Kohler Co., Kohler, WI (US)

(72) Inventors: Jon Proeber, Fox Point, WI (US); Nithin Ramachandran, Brookfield, WI (US); Shreshtha Gupta, Chhattisgarh (IN); Rahul Hirve, Pune (IN); Aaditya Tank, Maharashtra (IN)

(73) Assignee: Kohler Co., Kohler, WI (US)

( * ) Notice: Subject to any disclaimer, the term of this patent is extended or adjusted under 35 U.S.C. 154(b) by 272 days.

(21) Appl. No.: 18/666,336

(22) Filed: May 16, 2024

(65) Prior Publication Data

US 2024/0395012 A1 Nov. 28, 2024

Related U.S. Application Data

(60) Provisional application No. 63/468,894, filed on May 25, 2023.

(51) Int. Cl.

*G06V 10/74* (2022.01)
*G06V 10/764* (2022.01)
*G06V 10/82* (2022.01)

(52) U.S. Cl.

CPC .......... *G06V 10/761* (2022.01); *G06V 10/764* (2022.01); *G06V 10/82* (2022.01); *G06V 2201/07* (2022.01)

(58) Field of Classification Search

None

See application file for complete search history.

(56) References Cited

U.S. PATENT DOCUMENTS 9,922,359 B2 3/2018 Tan
9,923,971 B2 3/2018 Madey
(Continued)

FOREIGN PATENT DOCUMENTS

CN 113850653 A 12/2021
KR 20200024538 A 3/2020
(Continued)

OTHER PUBLICATIONS

N. Sephus, S. Bhagavatula, P. Shastri and E. Gabriel, "An Industrial-Strength Pipeline for Recognizing Fasteners," 2015 IEEE 14th International Conference on Machine Learning and Applications (ICMLA), Miami, FL, USA, 2015, pp. 781-786. (Year: 2015).*
(Continued)

*Primary Examiner* — David Ometz

(74) *Attorney, Agent, or Firm* — Lempia Summerfield Katz LLC

(57) ABSTRACT

An apparatus for identification of a plumbing product includes a communication interface and a controller. The communication interface is configured to receive a raw image of the plumbing product. A first model is configured to analyze the raw image of the plumbing product. A second model is configured to analyze the raw image of the plumbing product in combination with supplemental information for the plumbing product. A third model is configured to analyze a cropped image of the plumbing product. The controller is configured to perform analysis using the models, such that the second model and the third model are performed in series when the first model indicates an object match for the plumbing product in the raw image, and the second model and third model are performed in parallel when the first model lacks the object match for the plumbing product in the raw image.

19 Claims, 12 Drawing Sheets

(56) References Cited

U.S. PATENT DOCUMENTS

| | | | | |
|---|---|---|---|---|
| 10,412,169 | B1 | 9/2019 | Madey | |
| 10,475,103 | B2 | 11/2019 | Hiranandani | |
| 10,567,584 | B2 | 2/2020 | Amir | |
| 10,748,200 | B2 | 8/2020 | Lagoni | |
| 10,769,694 | B2 | 9/2020 | Zhao | |
| 10,991,029 | B2 | 4/2021 | Jain | |
| 11,087,273 | B1 | 8/2021 | Bergamo | |
| 11,100,328 | B1 | 8/2021 | Schuster | |
| 11,126,845 | B1 | 9/2021 | Chaturvedi | |
| 11,127,074 | B2 | 9/2021 | Ghadar | |
| 11,373,228 | B2 | 6/2022 | Soohoo | |
| 11,373,231 | B2 | 6/2022 | Soohoo | |
| 2016/0224832 | A1* | 8/2016 | Madey | H04L 67/1097 |
| 2017/0372127 | A1 | 12/2017 | Meany | |
| 2019/0065851 | A1 | 2/2019 | Cardis | |
| 2020/0042954 | A1 | 2/2020 | Parris | |
| 2020/0104594 | A1 | 4/2020 | Zucker | |
| 2020/0342421 | A1 | 10/2020 | Ramer | |
| 2020/0349626 | A1 | 11/2020 | Lagoni | |
| 2021/0035188 | A1 | 2/2021 | Ksyta | |
| 2021/0073891 | A1 | 3/2021 | Al Jadda | |
| 2021/0133850 | A1 | 5/2021 | Ayush | |
| 2021/0174371 | A1 | 6/2021 | Yoffe | |
| 2021/0232802 | A1 | 7/2021 | Meany | |
| 2021/0383226 | A1 | 12/2021 | Doersch | |
| 2024/0233437 | A1* | 7/2024 | Liu | G06V 40/161 |

FOREIGN PATENT DOCUMENTS

| | | | |
|---|---|---|---|
| WO | 2021046372 | A1 | 3/2021 |
| WO | 2021046383 | A1 | 3/2021 |
| WO | 2021061663 | A1 | 4/2021 |
| WO | 2021133511 | A1 | 7/2021 |
| WO | 2021234842 | A1 | 11/2021 |
| WO | 2021245287 | A2 | 12/2021 |

OTHER PUBLICATIONS

Cai Zhaowei et al:"Cascade R-CNN: High Quality Object Detection and Instance Segmentation", IEEE Transactions On Pattern Analysis and Machine Intelligence, IEEE Computer Society, USA, vol. 43, No. 5, Nov. 28, 2019 (Nov. 28, 2019), pp. 1483-1498, XP011846557, ISSN: 0162-8828, DOI: 10.1109/TPAMI.2019.2956516 [retrieved on Apr. 1, 2021].

Extended European Search Report from European Patent Application No. 24177188.0, dated Aug. 27, 2024, 8 pages.

Zou Xiaofeng et al: "Multi-task cascade deep convolutional neural networks for large-scale commodity recognition", Neural Computing and Applications, Springer London, London, vol. 32, No. 10, Jul. 1, 2019 (Jul. 1, 2019), pp. 5633-5647, XP037110807, [retrieved on Jul. 1, 2019].

* cited by examiner

PLUMBING FIXTURE PRODUCT IDENTIFICATION

CROSS-REFERENCE TO RELATED APPLICATION

This application claims the benefit of and priority to U.S. Provisional Patent Application No. 63/468,894, filed May 25, 2023, which is incorporated herein by reference.

FIELD

The present disclosure relates to product identification for plumbing fixture related devices.

BACKGROUND

Customers may contact customer service centers or online resources for help with particular products. The customer may seek assistance with the products. For example, the customer may need help troubleshooting to identify a solution for a malfunctioning product. The customer may seek a replacement for an against or inoperable device. The customer may seek a new device that matches the product. Unfortunately, customers cannot always readily identify the product. Product names are not printed on many products. This may be especially true in homes or buildings for plumbing fixture devices, or for devices attached to walls, countertops, etc. Model numbers or serial numbers may be difficult to find, may be found only on tags that have been removed, or included only on documentation that cannot be located. When customers call customer service centers or visit online channels for these devices, one of the preliminary inquiries is identification of the product. Such identification may involve a substantial portion of the time of the customer service time and other resources.

The present disclosures addresses automatic techniques and processes for identification of devices based on an image of the device.

BRIEF DESCRIPTION OF THE DRAWINGS

Exemplary embodiments are described herein with reference to the following drawings, according to an exemplary embodiment.

DETAILED DESCRIPTION

A plumbing fixture may be defined as an apparatus connected to the plumbing system of a house, building, or facility. A plumbing fixture device may include additional apparatus connected to the plumbing fixture. Examples for the plumbing fixture or plumbing fixture device includes faucets, basins, showerheads, urinals, toilets, or other devices.

Traditionally, plumbing fixtures or plumbing fixture devices require a licensed plumber for repair and/or replacement. However, do it yourself (DIY) installations and repairs are becoming more popular. Even in cases when a professional seeks to resolve an issue, it may not be obvious for which product they are troubleshooting. Identification of a plumbing fixture is an important step for the professional. The professional too often relies on experience, knowledge and know-how, but still may have difficulty in identifying the product. Consumers also request assistance with the DIY installations and repair. A variety of options may be available to consumers to contact a manufacturer or other assistance services for information on the plumbing fixture device. In some instances the consumer requests troubleshooting a malfunction in the plumbing fixture device. In some instances the consumer requests assistance in selection of a replacement of the plumbing fixture device. In both situations, the initial inquiry is to identify the plumbing fixture device. The following embodiments include systems and techniques for the identification of plumbing fixture devices based on one or more images collected by the consumer and analyzed using multiple learned models.

While the following examples are described in the context of plumbing fixture devices, the techniques and apparatus described herein are also applicable to other types of devices. These devices may be wall mounted devices such as a towel rack, a toilet paper holder, a robe hook, a light sconce, a mirror, or other devices.

Figure 1:
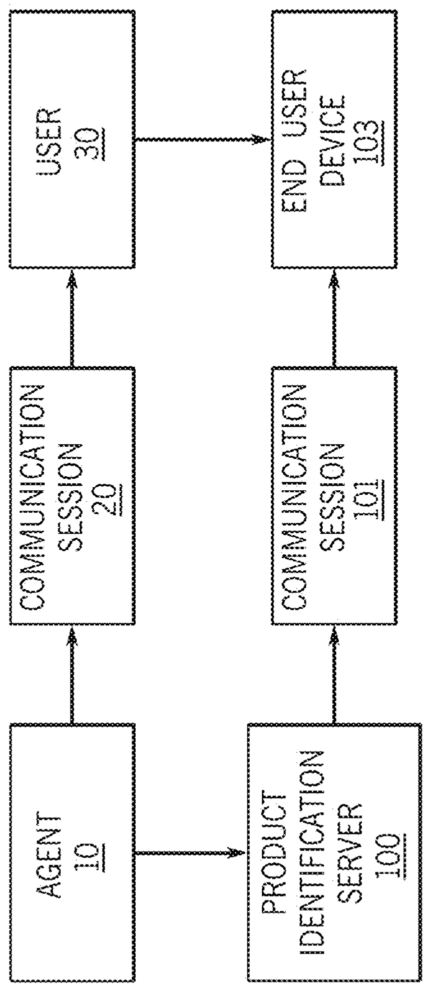
FIG. 1 illustrates an example customer service and product identification system.

FIG. 1 illustrates an example customer service and product identification system. The system includes at least a product identification server 100 that is configured to send and receive data with an end user device 103 through communication session 101. The end user device 103 may include a mobile device such as a smart phone, a computer such as a laptop, a tablet or another electronic device. Additional, different, or fewer components may be included.

An operator such as user 30 may operate the end user device 103. In addition, an operator such as agent 10 may provide commands or enter data into the product identification server 100. The agent 10 and the user 30 may communicate via communication session 20, which may be a phone call, a chat window or another exchange of messages, voice, or data.

The agent 10 may also communicate with the user 30 via the product identification server 100 and the end user device 103. The communication session 101 may be generated independently of the communication session 20. For example, the communication session 101 may be made through a packet switched network, and communication session 20 may be on the public switched telephone network (PSTN) or plain old telephone service (POTS).

The communication session 101 may also be initiated by user 30 independently from agent 10. For example, the user 30 may visit an online web page and initiate the request for identification without the help of an agent.

However, the communication session 20 and communication session 101 may be combined into a single communication session including voice and data. Examples include video call services. The communication session 101 may be generated in response to the communication session 20. That is, the conversation on the communication session 20 may cause one or more of the parties (e.g., agent 10 or user 30) to send a link via email, text message, or other technique such that the link is used to create the communication session 101. The link may include identification information for the user so that when the end user device 103 executes or otherwise opens the link, the product identification server 100 receives the identification information to associated inputs provided by the end user device 103 with the user 30.

For example, the user 30 may initiate the communication session 20 over the phone to request customer assistance with a plumbing product. During the communication session 20, it becomes apparent to the communication session 20 and/or user 30 that the plumbing product cannot be adequately identified over the communication session 20. In response to this determination, the agent 10 may initiate the communication session 101. The communication session 101 may be initiated by sending the user a link. The link may be transmitted over communication session 20 to the same phone number used in the communication session 20. The link may be emailed to the user 30. The user 30 may be instructed to download an application, or otherwise access an online hosted application, that establishes the communication session 101. The link provides the connection for communication session 101 to connect the user 30 and the agent 10.

The user 30 may be prompted to provide one or more images of the plumbing product via the communication session 101. The provided image(s) may include a raw image. The raw image may be an image that has not been cropped, filtered, or analyzed. The raw image may be captured by the end user device 103 (e.g., by a camera on a smart phone). The raw image is sent to the product identification server 100 via the communication session 101.

The product identification server 100 is configured to analyze the raw images in order to identify the plumbing product. The product identification server 100 may perform an image processing technique such as template matching, edge detection, feature extraction or another example to identify the plumbing product. The product identification server 100 may store a set of templates with each template associated with a different plumbing product. The set of templates may correspond to a portfolio of products from a particular manufacturer for the product identification server 100. Each template in the set of templates may correspond to a different SKU. The product identification server 100 compares the raw images to the set of templates and determines the particular SKU or plumbing product that is the best match.

Figure 2:
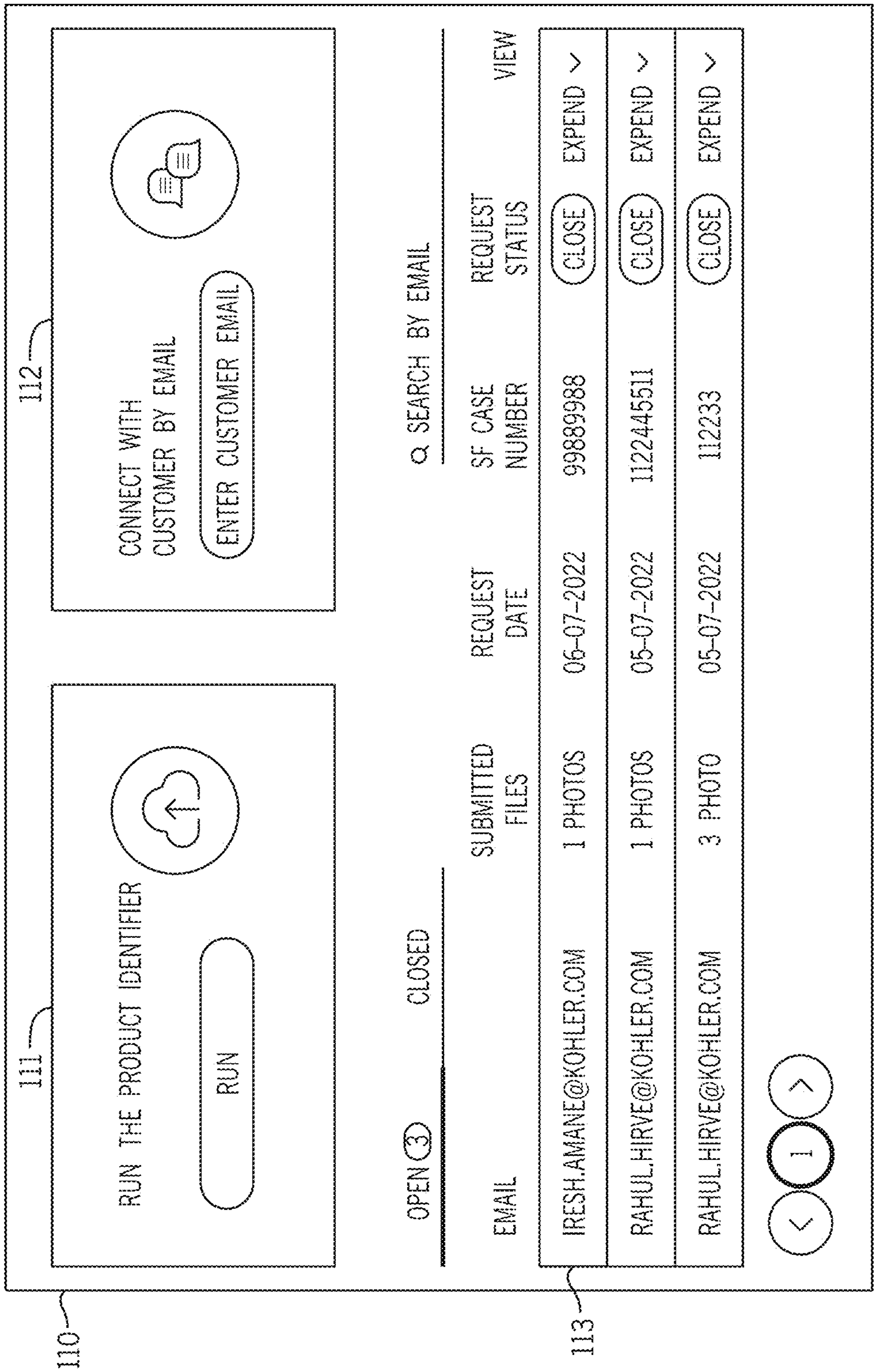
FIG. 2 illustrate an example agent interface for the customer service and product identification system.

FIG. 2 illustrate an example agent interface 110 for the customer service and product identification system. The agent interface may be provided to a terminal or computer for the agent 10. The agent interface 110 allows the agent 10 to manage the images received from various users 30.

The agent interface 110 may include identifier 111 including a button or other user input to cause the product identification server 100 to execute the image processing technique on the raw image provided by the user 30.

The agent interface 110 may include connector 112 including a button or other user input to cause the product identification server 100 to send the link to the user 30. The link may be an address to initiate the communication session 101.

The agent interface 110 may include a customer list 113 that includes a list of the users 30 that have been sent a link, have an active communication session 101, or have submitted a raw image. The agent 10 may access the analysis of the image processing technique using the customer list 113. The analysis may describe the model number, SKU number, name, or other identifier or identifying characteristic of the product depicted in the raw image.

Figure 3:
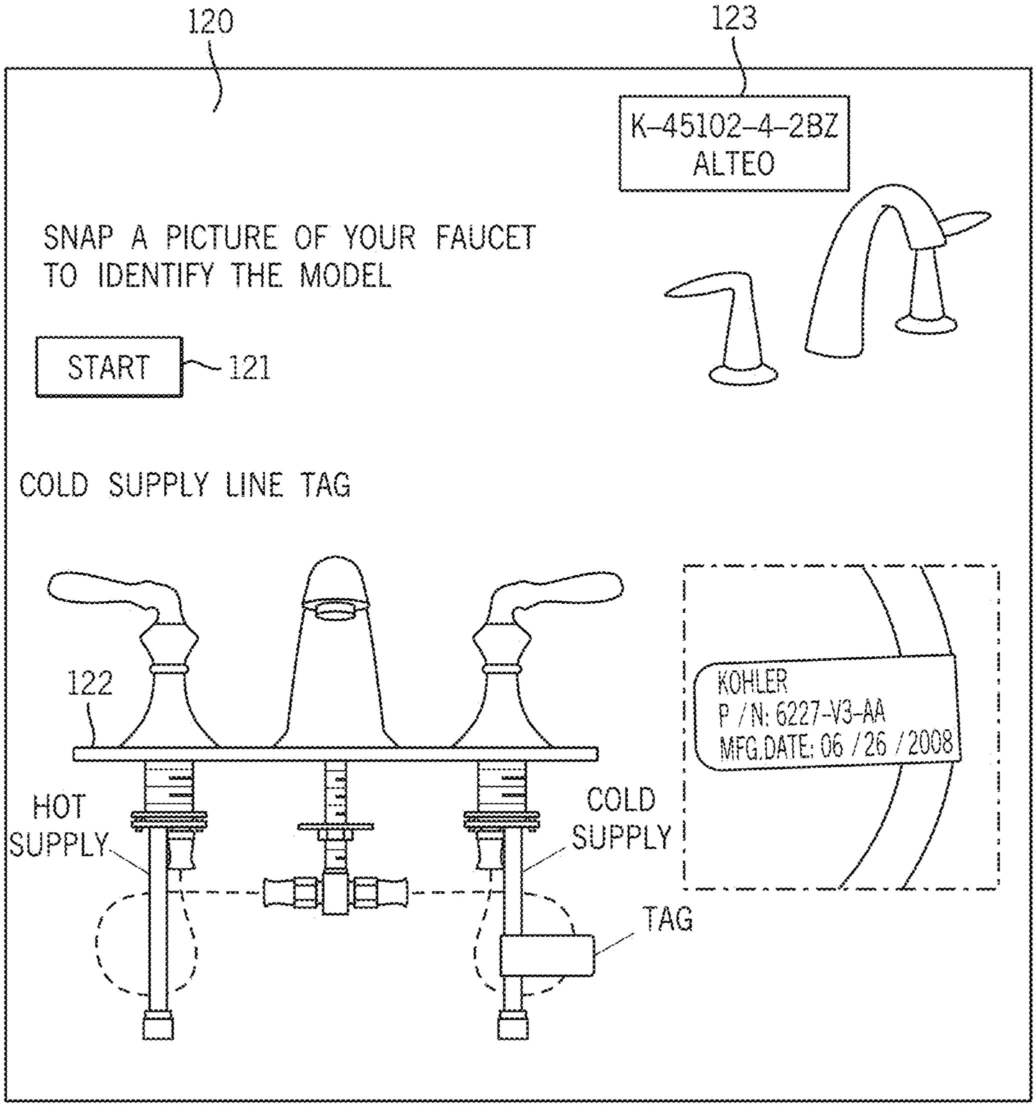
FIG. 3 illustrates an example end user interface for the customer service and product identification system.

FIG. 3 illustrates an example end user interface 120 for the customer service and product identification system. The user interface 120 may be provided by a mobile application on the end user device 103. The end user interface 120 may include a user input 121, a guide portion 122, and a result portion 123. Additional, different, or fewer components may be included.

The user input 121 may initiate operation of the camera app on the end user device 103. The user input 121 causes the end user device 103 to collect the raw image. The user points the end user device 103 at the product of interest and collects the image. The user input 121 may launch a specialized camera application including a template as described with respect to FIG. 4.

In addition or in the alternative to image collection, the guide portion 122 may direct the user where to find a tag or including indicia to identify the product. The indicia may include a quick read (QR) code, bar code, or alphanumeric characters to identify the product. In some examples, the user directly observes the identity of the product from the tag or code. In other examples, when applicable, the user collects the image of the tag or code for subsequent analysis and identification of the product.

The result portion 123 may display or otherwise provide the results of the analysis of the image at the product identification server 100 to the user at the end user device 103. The result portion 123 may include the name or model number of the product that is identified. The result portion 123 may also provide links or files related to documentation for the identified product, substitutes of the identified product, or manuals and literature for the identified product.

Figure 4:
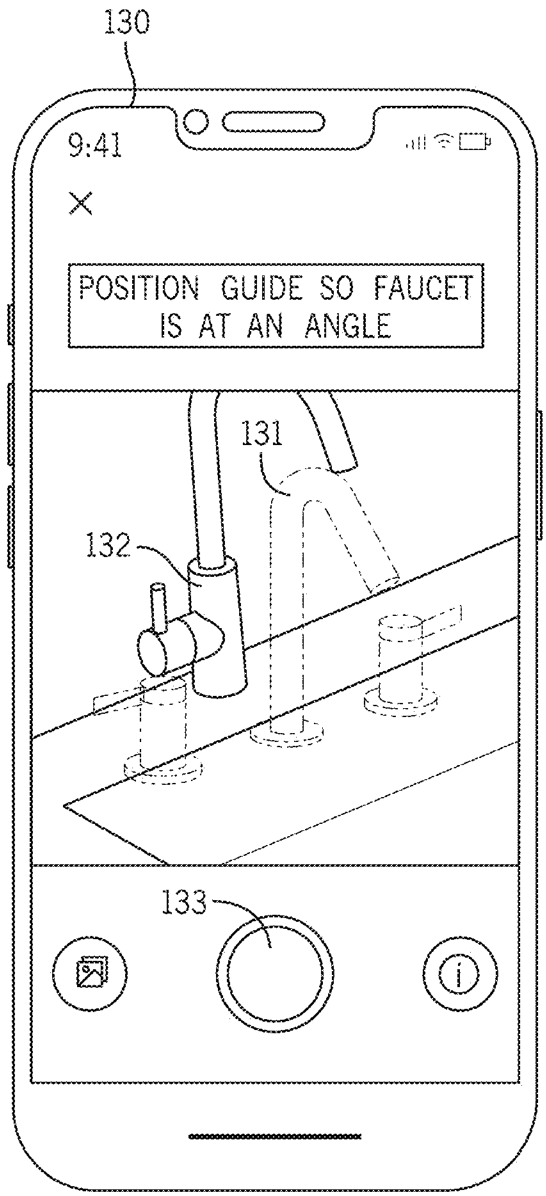
FIG. 4 illustrates an example product identification for the customer service and product identification system.

FIG. 4 illustrates an example product identification camera interface 130 for the customer service and product identification system. The interface 130 may include a template 131 for matching a product 132 in the image. The template 131 may be selected based on the classification of the product, which may be entered by the user or agent, or be determined through a preliminary image analysis. The user may be directed to move the end user device 103 and view of the camera in order to align the product 132 with the template 131. In some examples, when the user observes alignment of the product 132 with the template 131, the user presses a capture button 133 to collect the image. In other examples, the end user device 103 may automatically trigger collection of the image when the product 132 and the template 131 become substantially aligned.

Figure 5:
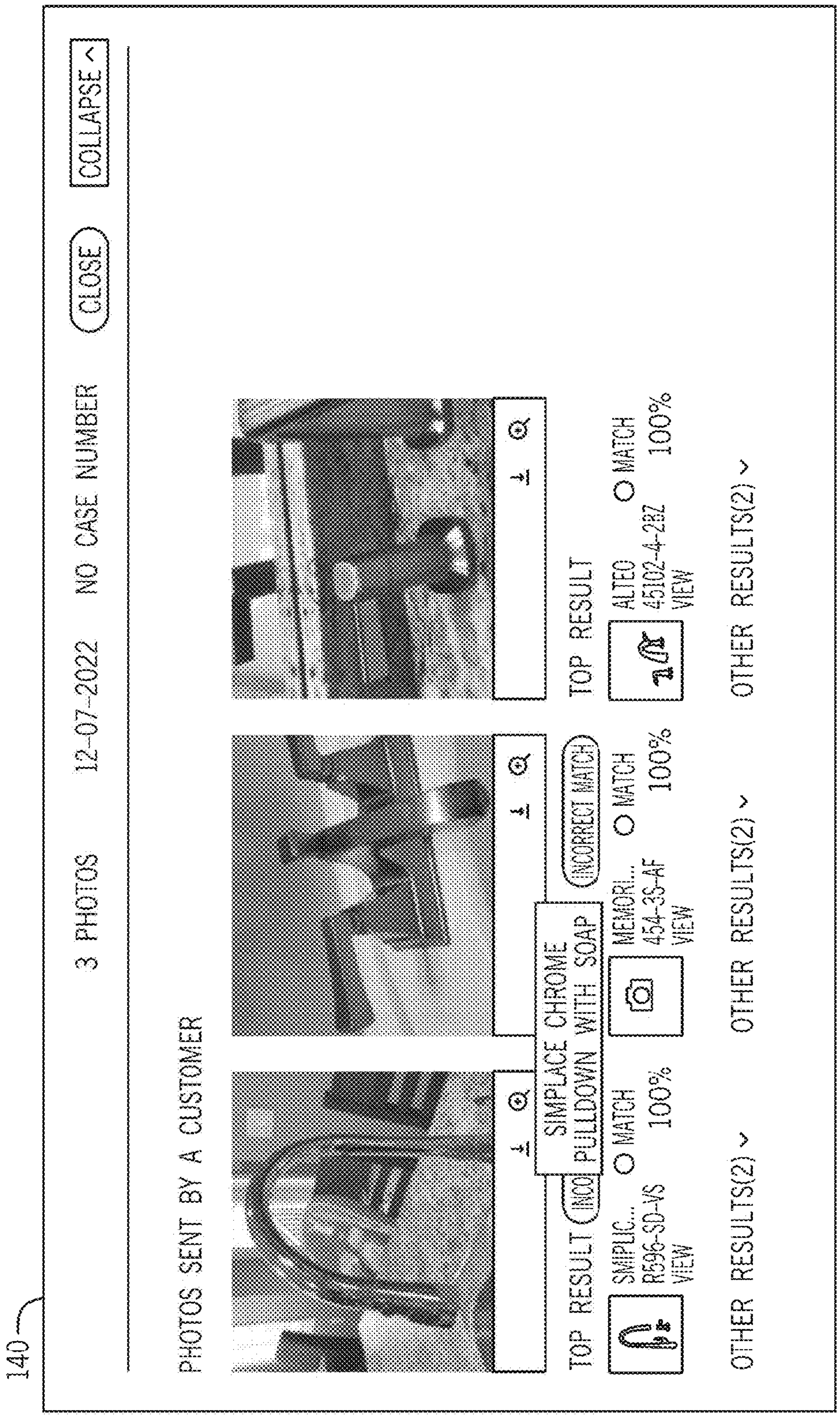
FIG. 5 illustrates product images for the customer service and product identification system.

FIG. 5 illustrates a summary interface 140 for the agent 10 or product identification server 100. The summary interface 140 includes product images provided by various users 30 and well as the corresponding results for the product identification system.

Figure 6:
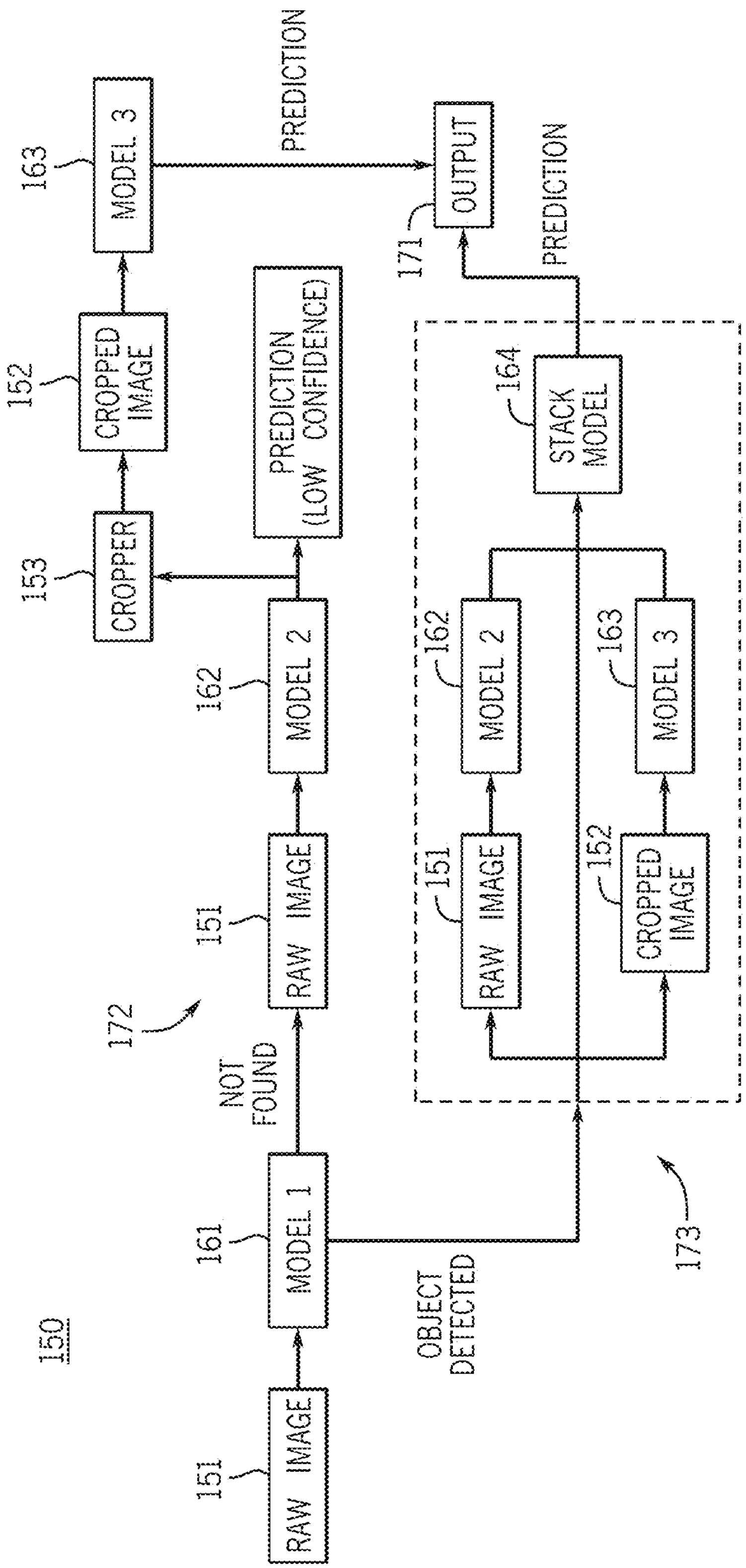
FIG. 6 illustrates an example learned model sequence for the customer service and product identification system.

FIG. 6 illustrates an example learned model sequence 150 for the customer service and product identification system. The learned model sequence 150 is an example image processing technique that utilizes multiple learned models such as neural networks to analyze one or more images of plumbing products. The learned model sequence 150 may include a first learned model 161 or first neural network, a second learned model 162 or second neural network, and a third learned model 163 or third neural network. Each model may be associated with an application programming interface (API). The API for the first model 161 is an object detection API configured to identify the product in the image. The API for the second model 162 is a raw image API configured to analyze a raw image including other objects besides the object of interest. The API for the third model 163 is a cropped image API configured to analyze a cropped image is tight around the object of interest. The API for the stacked model 164 combines the other three APIs.

A raw image 151 is input to the learned model sequence 150, which provides output 171 including at least one predicted value for the identification of the plumbing product. Additional, different, or fewer components may be included.

The learned model sequence 150 receives the raw image 151 collected by the user 30. The raw image 151 depicts an unidentified plumbing product. In some examples, the learned model sequence 150 may also receive supplemental data from the user 30. The supplemental data may include a classification of the plumbing product. The classification describes the category or type of plumbing product but does not identify the specific model or SKU of the plumbing product. Example classifications may include faucet, toilet, urinals, showerhead, basin, bathtub or other types of plumbing products.

Figure 7:
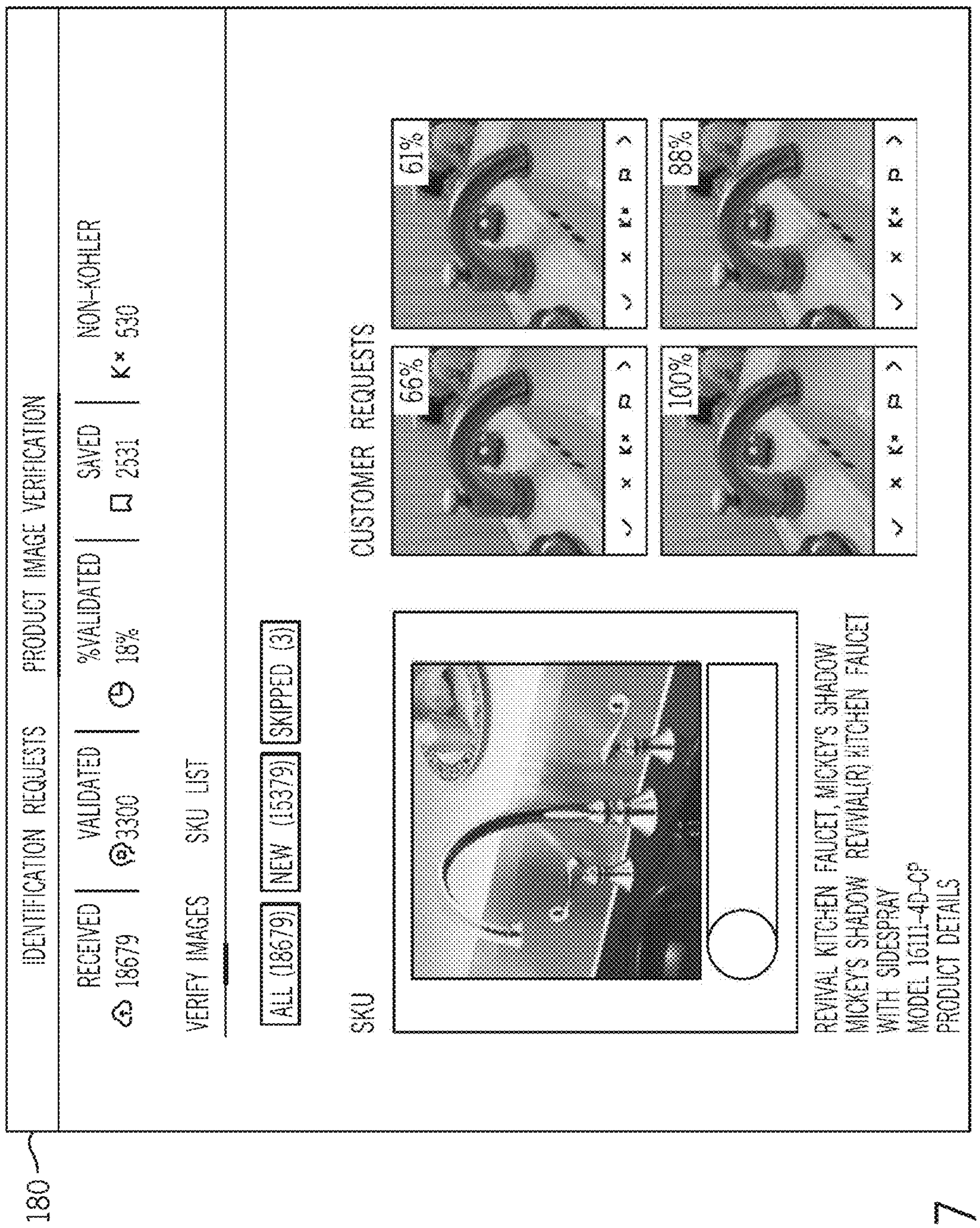
FIG. 7 illustrates an example validation interface for the product identification system.

The learned model sequence 150 analyzes the raw image 151 using the first model 161. The first model 161 may be a neural network trained on images of plumbing products having known models. The ground truth set of images (e.g., training images) may be provided by the agents of the customer service center. The ground truth set of images are images where the depicted products have been expertly identified by experienced agents 10. The product identification server 100 may provide a validation interface 180 for identification of training images, as shown in FIG. 7. The validation interface 180 provides images supplied by users 30 and accepts identification inputs from agents 10. The validation interface 180 may display multiple images simultaneously. Multiple agents 10 may be provided the same images for redundant identification. The identification inputs become the ground truth for training the learned models 161, 162, 163. The models may be updated in near real time as multiple agents provide ground truth information and identify incoming images as they are received by the product identification server 100.

In addition, multiple versions of the learned models 161, 162, and 163 may be developed (e.g., trained) for different product classifications. Example classifications include bathroom faucets, kitchen faucets, single hole faucets, three hole faucets, sinks, bathtubs, bath faucets, showerheads, or other examples. The product identification server 100 may receive classification information for the plumbing fixture from the user 30 or the agent 10 and select the one of the possible first models 161, second models 162, and/or third models 163 from a set of possible models based on the classification information.

The learned model sequence 150 provides the raw image to the multiple learned models either in parallel (e.g., parallel path 173) or in series (e.g., series path 172) depending on the results of the first model 161. The results of the first model 161 may be evaluated based on a confidence score or prediction probability from the first model 161. When the results of the first model 161 have a high confidence value (e.g., above a confidence threshold), the product identification server 100 determines that an object was detected and proceeds to the parallel path 173. The high confidence may also be indicated by the object detection API (first model 161) returning a bounding box. The bounding box may be a set of coordinates (xmin, ymin, xmax, ymax) for the selected portion of the uploaded image indicative of the detected object.

When the results of the first model 161 have a low confidence value (e.g., below the confidence threshold), the product identification server 100 determines that no object was found and proceeds to the series path 172. The low confidence score may also be indicated with the object detection API (first model 161) endpoint fails to detect any product or SKU in the uploaded image and the API returns "xmin: None" in response.

In the parallel path 173, the product identification server 100 may provide the raw image to the second model 162. The second model 162 includes a raw image API, which outputs another prediction value and prediction probability for the object in the image. The second model 162 provides a higher confidence threshold for the final prediction.

In the parallel path 173, the product identification server 100 uses the bounding box coordinates from the original image to crop the image. The cropped image 152 is provided to the third model 163, which has been trained on cropped images. The third model 163 outputs a prediction value from the cropped image 152 and a corresponding confidence value or prediction probability.

A fourth model or stack model 164 is provided the prediction and probability output from the first model 161 (object detection API configured to identify the product in the image), second model 162 (raw image API configured to analyze a raw image including other objects besides the object of interest), and third model 163 (cropped image API configured to analyze a cropped image). The API for the stacked model 164 combines the prediction and probability outputs from the other three APIs or models and outputs a final prediction for output 171, which will be displayed to the agent 10 and/or user 30. In addition, output 171 may include a bounding box over the object and a label for the product or SKU.

In the series path 172, when the first model 161 outputs a low prediction probability or confidence score, the product identification server 100 will forward the raw image 151 to the second model 162. The second model 162 includes a raw image API, which outputs another prediction value and prediction probability for the object in the image. The second model 162 provides a higher confidence threshold.

In addition, in response to the low prediction probability or confidence score, the product identification server 100 generates a warning (e.g., object not found) to the user and prompts the user to crop the image. In the series path 173, the product identification server 100 may prompt the user to crop the object in the image using a cropper 153 (cropping tool or cropping module) to crop (select a portion of the image) out the object in the image. Thus, in this example, the user provides the bounding box to create a cropped image 152, which is provided to the third model 163.

The third model 163 (cropped image API) then provides a final prediction and prediction probability as the output 171 to be displayed to the agent 10 and/or user 30. In addition, output 171 may include a bounding box over the object and a label for the product or SKU.

In this way, two separate independent workflows are provided to analyze the image collected by the user. The selection of the workflow is dependent on the result of the first model 161.

Information may be accessed based on output 171 and provided to the user 30 or the agent 10. In one example, the product identification server 100 accesses a part database in response to the prediction value for the product and sends data from the part database to the user 30 based on the identified product. The user 30 may automatically or be prompted with the option to order the part in response to the output 171.

In one example, the product identification server 100 accesses a troubleshooting database in response to the prediction value for the plumbing product. The information from the troubleshooting database may be provided to the agent 10 to assist the user 30 in troubleshooting a problem. In addition, the data from the troubleshooting database to the user 30 directly.

In one example, the product identification server 100 accesses a substitution database in response to the prediction value for the product. The product identification server 100 may provide the agent 10 or the user 30 with substitute information to replace the identified product. The user 30 may automatically provide or be prompted with the option to order the substitute product in response to the output 171.

In one example, the product identification server 100 accesses a complementary product database in response to the prediction value for the product. The product identification server 100 may provide the agent 10 or the user 30 with product information or model numbers of products that complement the identified product. The user 30 may automatically provide or be prompted with the option to order the complementary product in response to the output 171.

Figure 8:
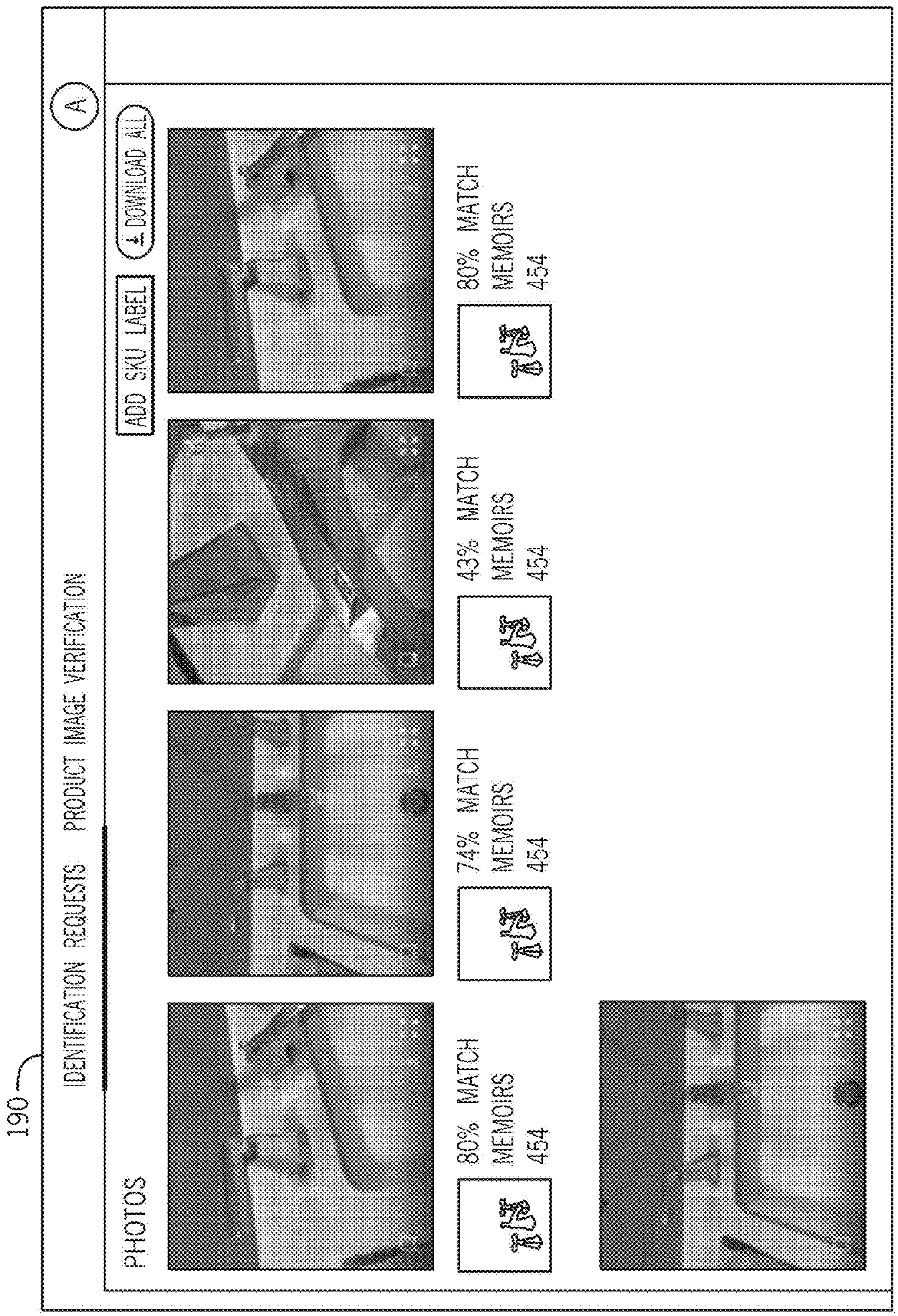
FIG. 8 illustrates an example embodiment including multiple images of the product.

FIG. 8 illustrates an example embodiment in which multiple images of the product from multiple angles or perspectives are used in training. A multiple view interface 190 may be displayed for the agent 10 by product identification server 100. The customer list 113 may include multiple images of a product in question over the course of the communication session 101. All of these images of parts or pieces of the product can then be verified by the agent to train the sum of the product SKU based on multiple angles. The agent may then verify all images associated with a recognized single image, further strengthening the model.

Figure 9:
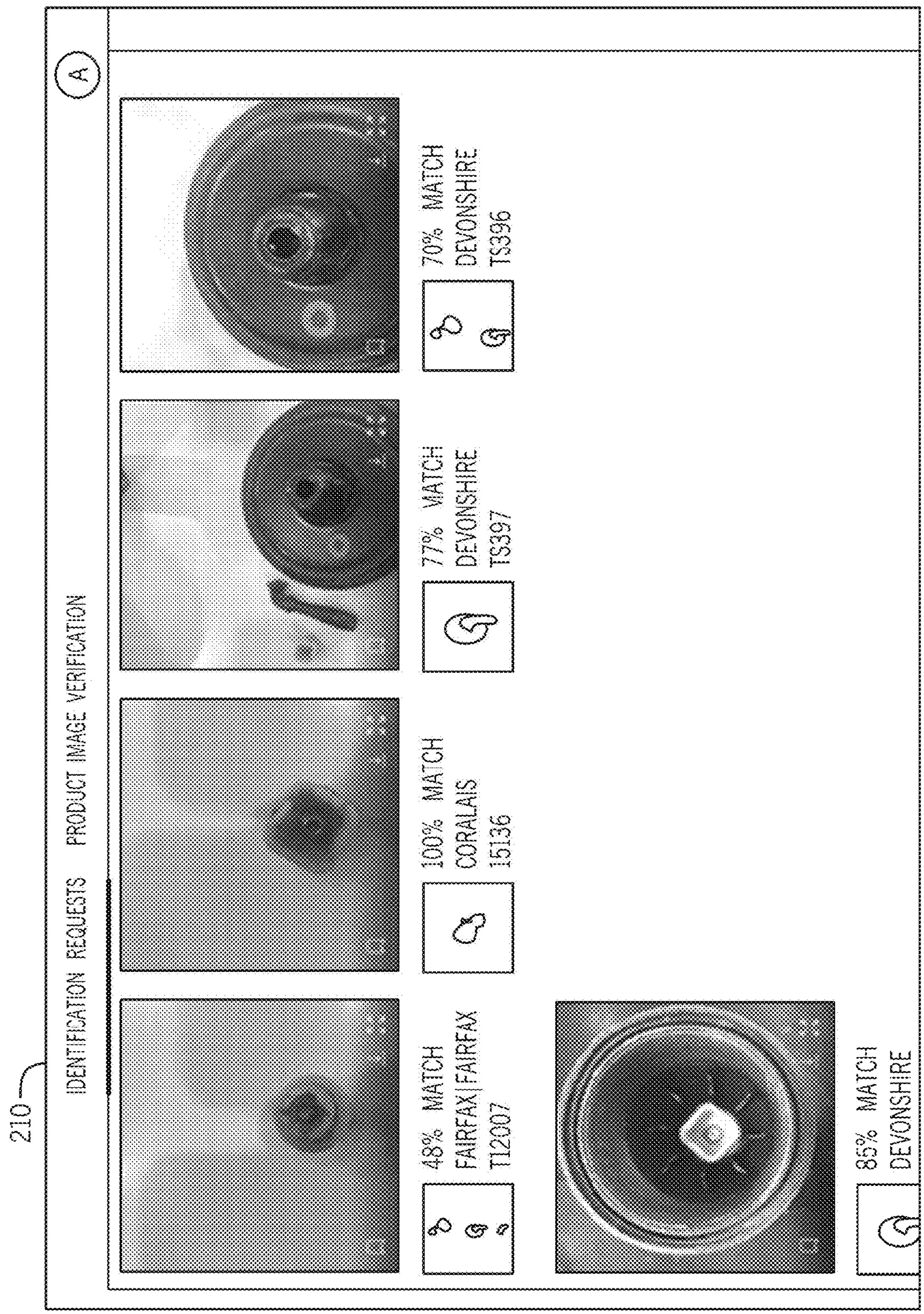
FIG. 9 illustrates an example embodiment in which partial views or broken products are provided to the model.

FIG. 9 illustrates an example embodiment in which partial views or broken products are provided to the model. The partial view interface 210 may provide such partial views or images of broken products or separated parts to the agent 10 by the product identification product. The agent 10 may apply this view to the model as additional ground truth. This ground-truth set of images may include partial views or broken products. Subsequent images having partial views or product products may be identified by the model. In this way, expert identification is done on one image by the model or the expert are used to train multiple other images of associated product views that would not normally be known or recognized by the model or expert unless this correlation is made in the design/invention of the system. For the purpose of troubleshooting, various angles of products are shared due to the nature of the product being broken and not shown in the original form.

Figure 10:
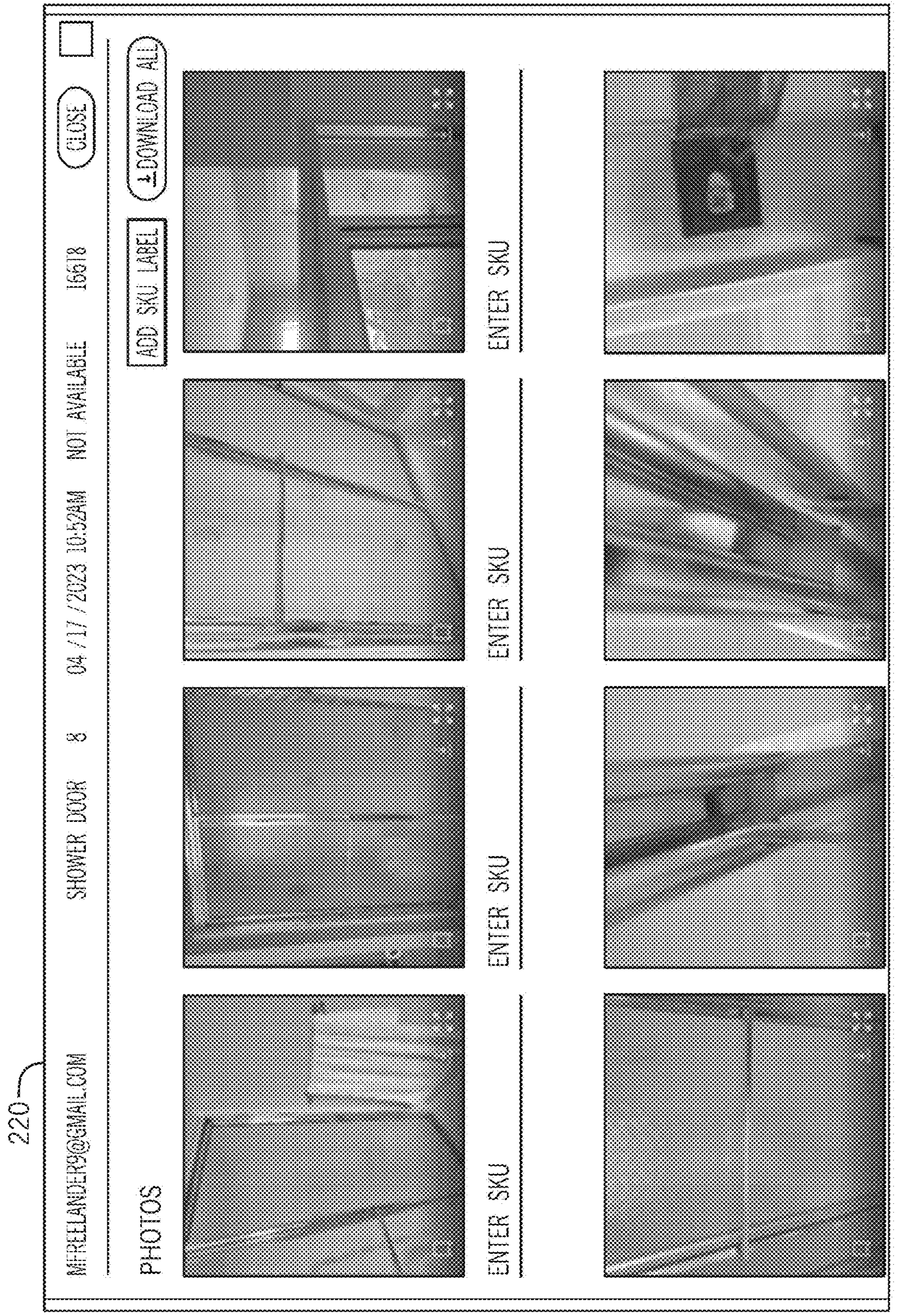
FIG. 10 illustrates an example embodiment in which new categories or classifications of products are generated.

FIG. 10 illustrates an example embodiment in which new categories or classifications of products are generated. The agent 10 or the model may identify a type of product that is not presently in the model. The new product interface 220 is used to build a training set for products that are known to not be identified by the model, by allowing the agent to manually identify the product in a category that has not yet been trained to build sufficient training data to create a recognized model category. In the illustrated example, no training data for a shower door category exists. When the model identifies a predetermined volume of customer demand, the agent 10 may be prompted to train a new category for future images.

Figure 11:
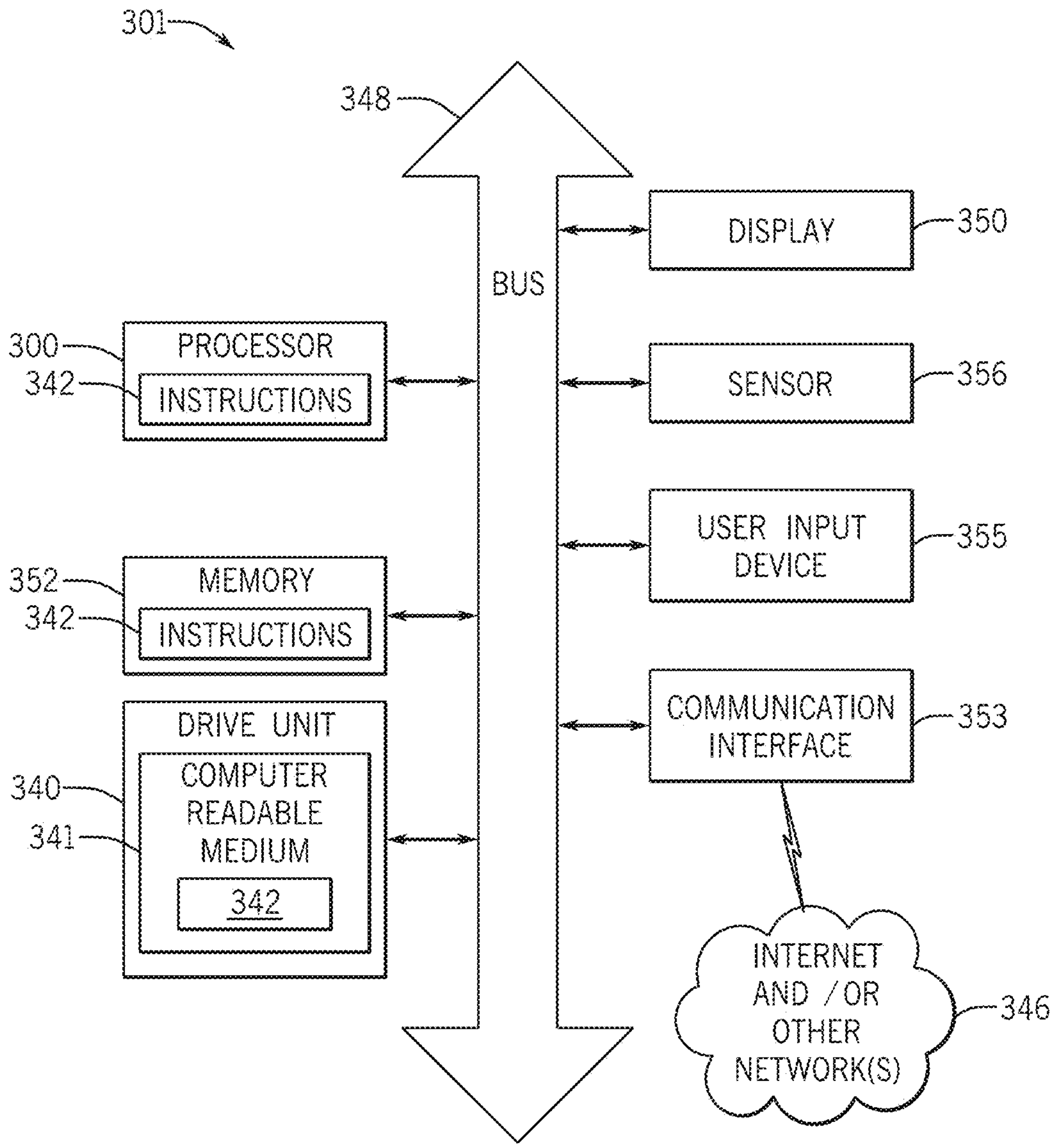
FIG. 11 illustrates an example controller for the examples of FIGS. 1-10.

FIG. 11 illustrates an example controller 301 for product identification and customer assistance in response to the product identification. The product identification server 100 may implement the controller 301. The controller 301 may include a processor 300, a memory 352, and a communication interface 353 for interfacing with devices or to the internet and/or other networks 346. In addition to the communication interface 353, a sensor interface may be configured to receive data from sensors (e.g., proximity sensors).

The communication interface 353 is configured to receive a raw image of the plumbing product (e.g., from the end user device 103) and provide the raw image to the processor 300. The memory 352 is configured to store a first model configured to analyze the raw image of the plumbing product, a second model configured to analyze the raw image of the plumbing product in combination with supplemental information for the plumbing product, and a third model configured to analyze a cropped image of the plumbing product.

The processor 300 is configured to perform analysis using the first model, the second model, and the third model, such that the second model and the third model are performed in series when the first model indicates an object match for the plumbing product in the raw image, and the second model and third model are performed in parallel when the first model lacks the object match for the plumbing product in the raw image.

The components of the control system may communicate using bus 348. The control system may be connected to a workstation or another external device (e.g., control panel) and/or a database for receiving user inputs, system characteristics, and any of the values described herein.

Optionally, the control system may include an input device 355 and/or a sensing circuit/sensor 356 in communication with any of the sensors. The sensing circuit receives sensor measurements from sensors as described above. The input device may include any of the user inputs such as buttons, touchscreen, a keyboard, a microphone for voice inputs, a camera for gesture inputs, and/or another mechanism.

Optionally, the control system may include a drive unit 340 for receiving and reading non-transitory computer media 341 having instructions 342. Additional, different, or fewer components may be included. The processor 300 is configured to perform instructions 342 stored in memory 352 for executing the algorithms described herein. A display 350 may be an indicator or other screen output device. The display 350 may be combined with the user input device 355.

Figure 12:
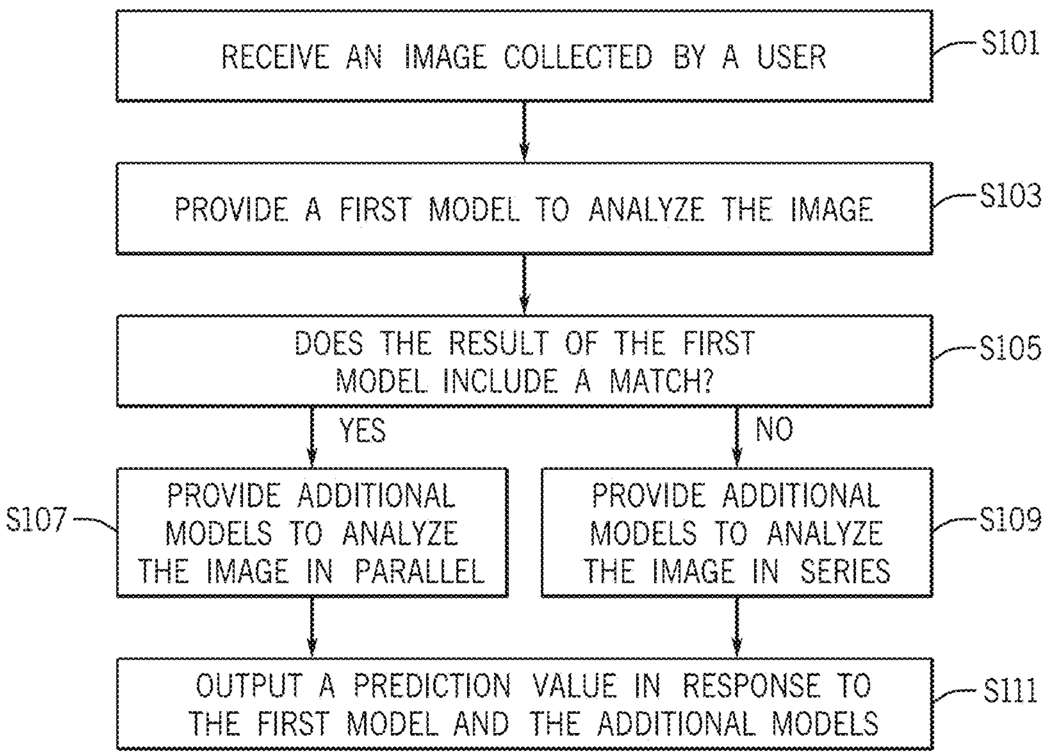
FIG. 12 illustrates a flow chart for the apparatus of FIG. 11.

FIG. 12 illustrates a flow chart for the apparatus of FIG. 16 to control a product identification system. The acts of the flow chart may be performed by the controller 301 implemented by the product identification server 100. Additional, different or fewer acts may be included.

At act S101, the controller 301 (e.g., processor 300) receives a raw image collected by a user, the raw image depicting the plumbing product. The raw image may be collected by the user using a camera or other type of image sensor (e.g., sensor 356). The user may initiate contact with the controller 301 via phone call, email, or other form of communication. The raw image collected by the user may be sent to the controller 301 through a second form of communication, which may be authenticated through a user account, warranty certification or other authentication technique.

At act S103, the controller 301 (e.g., processor 300) provides a first model to analyze the raw image. The first model may be a first neural network. The first model is configured to identify or otherwise match a plumbing product in the raw image. The first model may match the plumbing product from a previously stored set of faucets, basins, showerheads, urinals, toilets, or other devices. At act S105, the controller 301 (e.g., processor 300) determines whether the result of the first model includes a match. When no match is determined, the user is prompted, for example through display 350 and/or input device 355 to crop the image. The user may crop the image be highlighting the plumbing product in the image and effectively reducing the size of the image.

At act S107, when the first model indicates an object match for the plumbing product in the raw image, the controller 301 (e.g., processor 300), provides, in parallel, a second model for the raw image and a third model for a cropped version of the raw image. The second model may be a second neural network, and the third model may be a third neural network.

At act S109, when the first model lacks the object match for the plumbing product in the raw image, the controller 301 (e.g., processor 300), provides, in series, the second model for the raw image and the third model for the cropped version of the raw image.

At act S111, the controller 301 (e.g., processor 300), outputs a prediction value for the plumbing product in response to the first model, the second model, and the third model.

Processor 300 may be a general purpose or specific purpose processor, an application specific integrated circuit (ASIC), one or more programmable logic controllers (PLCs), one or more field programmable gate arrays (FPGAs), a group of processing components, or other suitable processing components. Processor 300 is configured to execute computer code or instructions stored in memory 352 or received from other computer readable media (e.g., embedded flash memory, local hard disk storage, local ROM, network storage, a remote server, etc.). The processor 300 may be a single device or combinations of devices, such as associated with a network, distributed processing, or cloud computing.

Memory 352 may include one or more devices (e.g., memory units, memory devices, storage devices, etc.) for storing data and/or computer code for completing and/or facilitating the various processes described in the present disclosure. Memory 352 may include random access memory (RAM), read-only memory (ROM), hard drive storage, temporary storage, non-volatile memory, flash memory, optical memory, or any other suitable memory for storing software objects and/or computer instructions. Memory 352 may include database components, object code components, script components, or any other type of information structure for supporting the various activities and information structures described in the present disclosure. Memory 352 may be communicably connected to processor 300 via a processing circuit and may include computer code for executing (e.g., by processor 300) one or more processes described herein. For example, memory 298 may include graphics, web pages, HTML files, XML files, script code, shower configuration files, or other resources for use in generating graphical user interfaces for display and/or for use in interpreting user interface inputs to make command, control, or communication decisions.

In addition to ingress ports and egress ports, the communication interface 353 may include any operable connection. An operable connection may be one in which signals, physical communications, and/or logical communications may be sent and/or received. An operable connection may include a physical interface, an electrical interface, and/or a data interface. The communication interface 353 may be connected to a network. The network may include wired networks (e.g., Ethernet), wireless networks, or combinations thereof. The wireless network may be a cellular telephone network, an 802.11, 802.16, 802.20, or WiMax network, a Bluetooth pairing of devices, or a Bluetooth mesh network. Further, the network may be a public network, such as the Internet, a private network, such as an intranet, or combinations thereof, and may utilize a variety of networking protocols now available or later developed including, but not limited to TCP/IP based networking protocols.

While the computer-readable medium (e.g., memory 352) is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an email or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. The computer-readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A method for identification of a plumbing product, the method comprising:
receiving a raw image collected by a user, the raw image depicting the plumbing product;
providing a first model to analyze the raw image;
when the first model indicates an object match for the plumbing product in the raw image, providing, in parallel, a second model for the raw image and a third model for a cropped version of the raw image;
when the first model lacks the object match for the plumbing product in the raw image, providing, in series, the second model for the raw image and the third model for the cropped version of the raw image; and
outputting a prediction value for the plumbing product in response to the first model, the second model, and the third model.

2. The method of claim 1, further comprising:
when the first model indicates the object match for the plumbing product in the raw image, cropping the raw image in response to the object match.

3. The method of claim 1, further comprising:
when the first model lacks the object match for the plumbing product in the raw image, prompting a user to manually crop the raw image.

4. The method of claim 1, further comprising:
establishing a communication session with the user; and
sending a link to collect the raw image to the user through the communication session.

5. The method of claim 4, wherein the link includes identification information for the user.

6. The method of claim 4, further comprising:
receiving classification information for the plumbing product from the user, wherein the first model, the second model, or the third model is based in part on the classification information.

7. The method of claim 1, wherein when the first model lacks the object match for the plumbing product in the raw image, providing an output of the first model as an input of the second model and an output of the second model as an input of the third model.

8. The method of claim 1, further comprising:
accessing a part database in response to the prediction value for the plumbing product; and
sending data from the part database to the user.

9. The method of claim 1, further comprising:
accessing a troubleshooting database in response to the prediction value for the plumbing product; and
sending data from the troubleshooting database to the user.

10. The method of claim 1, further comprising:
accessing a substitution database in response to the prediction value for the plumbing product; and
sending data from the substitution database to the user.

11. The method of claim 1, further comprising:
accessing a complementary product database in response to the prediction value for the plumbing product; and
sending data from the complementary product database to the user.

12. An apparatus for identification of a plumbing product, the apparatus comprising:
a communication interface configured to receive a raw image of the plumbing product;
a first model configured to analyze the raw image of the plumbing product;
a second model configured to analyze the raw image of the plumbing product in combination with supplemental information for the plumbing product;
a third model configured to analyze a cropped image of the plumbing product; and
a controller configured to perform analysis using the first model, the second model, and the third model, wherein the second model and the third model are performed in parallel when the first model indicates an object match for the plumbing product in the raw image, and the second model and third model are performed in series when the first model lacks the object match for the plumbing product in the raw image.

13. The apparatus of claim 12, wherein a prediction value is output for the plumbing product in response to the first model, the second model, and the third model.

14. The apparatus of claim 12, wherein the controller generates a request for collection of the raw image of the plumbing product.

15. The apparatus of claim 12, wherein the plumbing product comprises a basin, a faucet, a showerhead, a toilet, or a urinal.

16. The apparatus of claim 12, wherein the first model includes a first neural network, the second model includes a second neural network, and the third model includes a third neural network.

17. The apparatus of claim 12, wherein the communication interface is configured to provide a first communication session between an end user device and a customer service center device and a second communication session between the end user device and the customer service center device.

18. The apparatus of claim 17, wherein the first communication session includes a voice or video call and the second communication session includes a file transfer.

19. A non-transitory computer readable medium including instructions that when executed are configured to perform a method comprising:

receiving a raw image collected by a user, the raw image depicting a plumbing product;

providing a first model to analyze the raw image;

when the first model indicates an object match for the plumbing product in the raw image, providing, in parallel, a second model for the raw image and a third model for a cropped version of the raw image;

when the first model lacks the object match for the plumbing product in the raw image, providing, in series, the second model for the raw image and the third model for the cropped version of the raw image; and outputting a prediction value for the plumbing product in response to the first model, the second model, and the third model.

* * * * *